April 7, 1931.　　　　　C. W. DAKE　　　　　1,799,285
LANDING LIGHT FOR AIRPLANES AND THE LIKE
Filed April 18, 1929　　　3 Sheets-Sheet 1
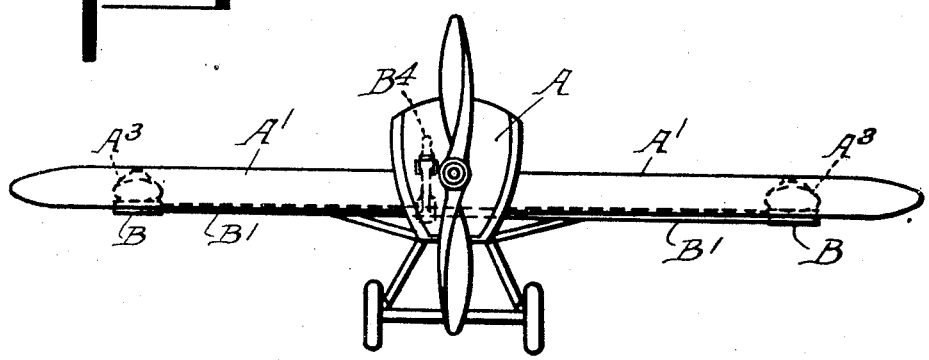
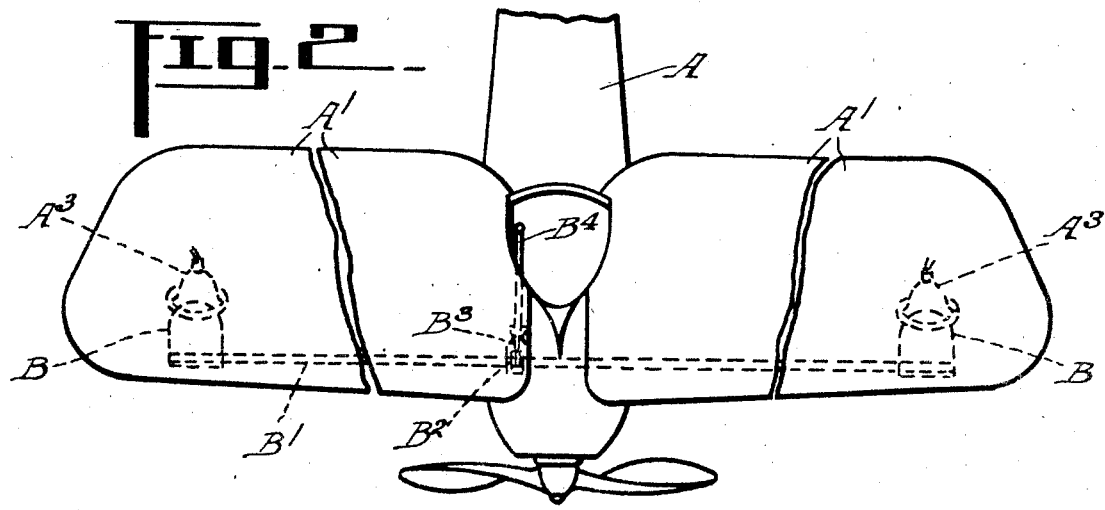
INVENTOR
Charles W. Dake
BY
ATTORNEY April 7, 1931. C. W. DAKE 1,799,285
LANDING LIGHT FOR AIRPLANES AND THE LIKE
Filed April 18, 1929 3 Sheets-Sheet 2
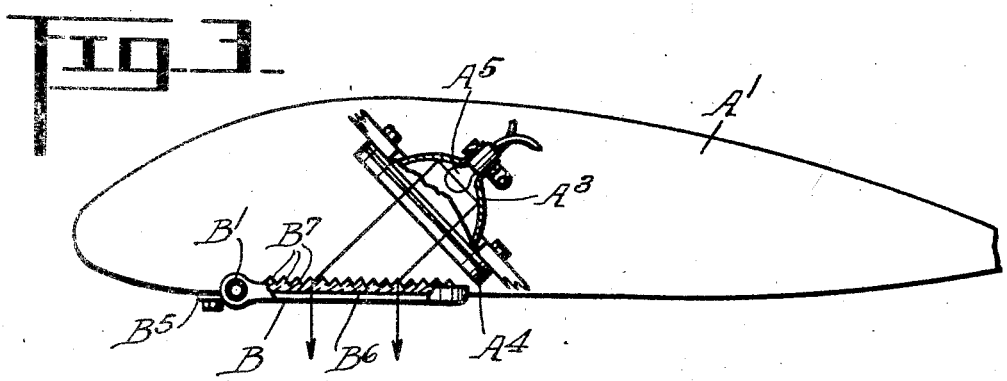
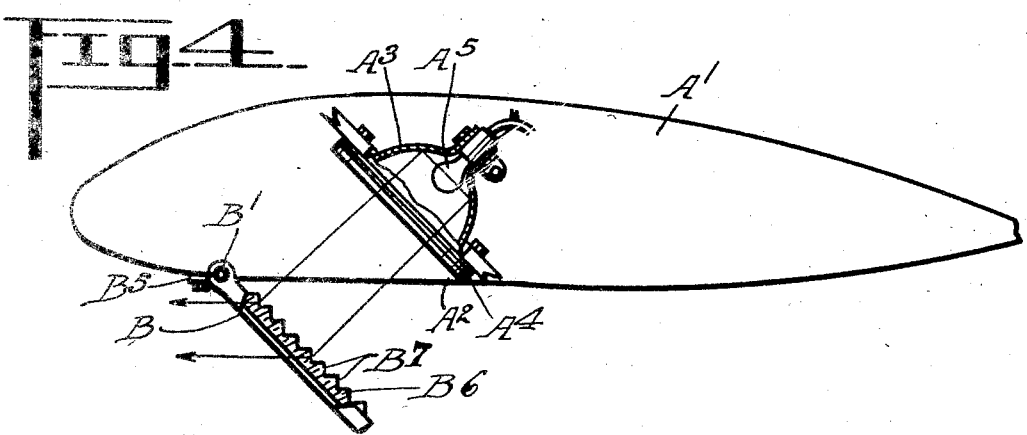
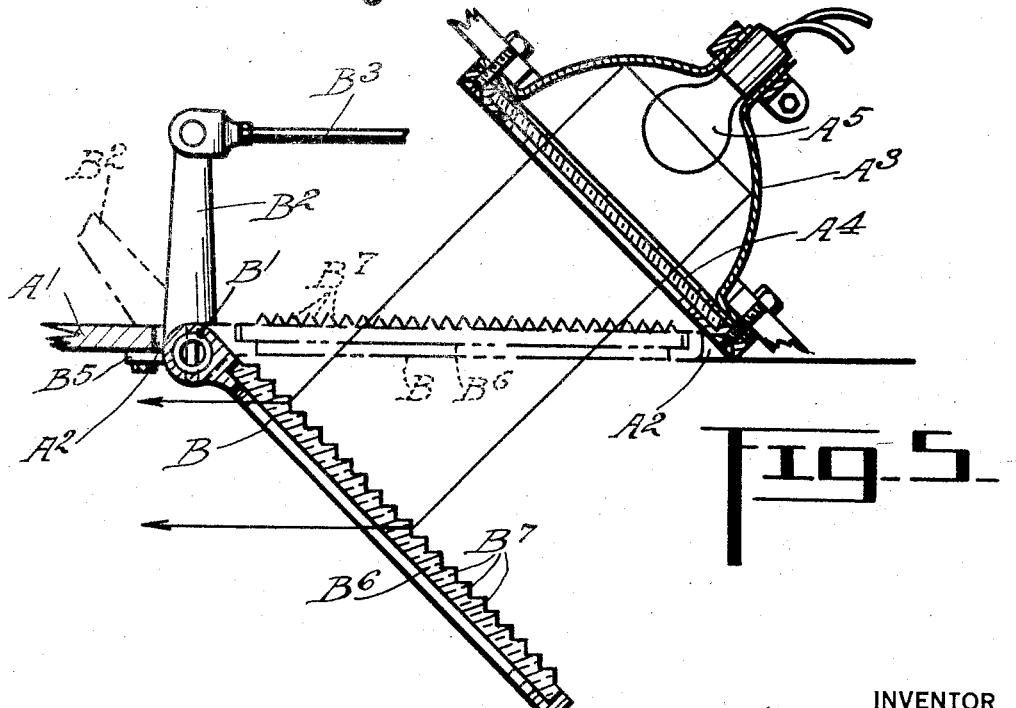
INVENTOR
Charles W. Dake
BY
Parker & Carter
ATTORNEY April 7, 1931.　　　　　　C. W. DAKE　　　　　　1,799,285
LANDING LIGHT FOR AIRPLANES AND THE LIKE
Filed April 18, 1929　　　3 Sheets-Sheet 3

INVENTOR
Charles W. Dake
BY
Parker & Carter
ATTORNEY

Patented Apr. 7, 1931

1,799,285

UNITED STATES PATENT OFFICE

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY

LANDING LIGHT FOR AIRPLANES AND THE LIKE

Application filed April 18, 1929. Serial No. 356,012.

My invention relates to improvements in landing lights for airplanes and the like and has for one object to provide a new and improved form of landing light wherein the light source and lamp are permanently enclosed within the wing section or within some part of the airplane or ship or other vessel so that no air resistance is caused by the light and additional means are provided for directing the light rays in any desired direction, such means being selectively in continuation of and forming part of the outer surface of the wing or other element or projecting therefrom as the case may be.

Preferably my invention comprises a fixed reflector bowl and light source or electric lamp contained within the body of the air foil and projecting its rays outwardly through an aperture in the wall thereof. This aperture is closed by a shutter which may lie in continuation of the air foil wall or may be projected therebeyond and this shutter is made of glass or other translucent material corrugated or prismatic so that as the light rays impinge upon it and pass through it they are reflected into a path inclined to the axis of the reflector bowl and by adjustment of the prismatic shutter may be directed forwardly in a direction parallel with the surface of the air foil downwardly in a direction normal to it or in any selected direction intermediate these two extremes.

The result of this arrangement is that the light source and the reflector bowl may be permanently and rigidly mounted, thus doing away with any difficulty in connection with electrical contacts and the like and thus permanently mounting the heavier parts of the apparatus inside the air foil where they cause no resistance. The prismatic shutter itself will be pivoted along its forward or leading edge and when the plane is in full flight will lie back parallel with the air foil surface and cause no change in its areodynamic character. For landing, this shutter will be opened and will to be sure cause some disturbance in the aerodynamic character of the air foil but this disturbance will be negligible in that it amounts to merely projecting a smooth flat flap or vane surface downwardly from the air foil for the short time required in landing.

My invention is illustrated more or less diagrammatically in the accompanying drawing, wherein—

Figure 1 is a front elevation of an airplane showing the position occupied by my light;

Figure 2 is a plan view, showing the position occupied by my light;

Figures 3 and 4 are diagrammatic showings with the light in section showing the position of light and prism with respect to the airplane wings in two different positions;

Figure 5 is a detail on an enlarged scale showing the relation between the light and shutter;

Like parts are indicated by like characters throughout.

Figure 6:
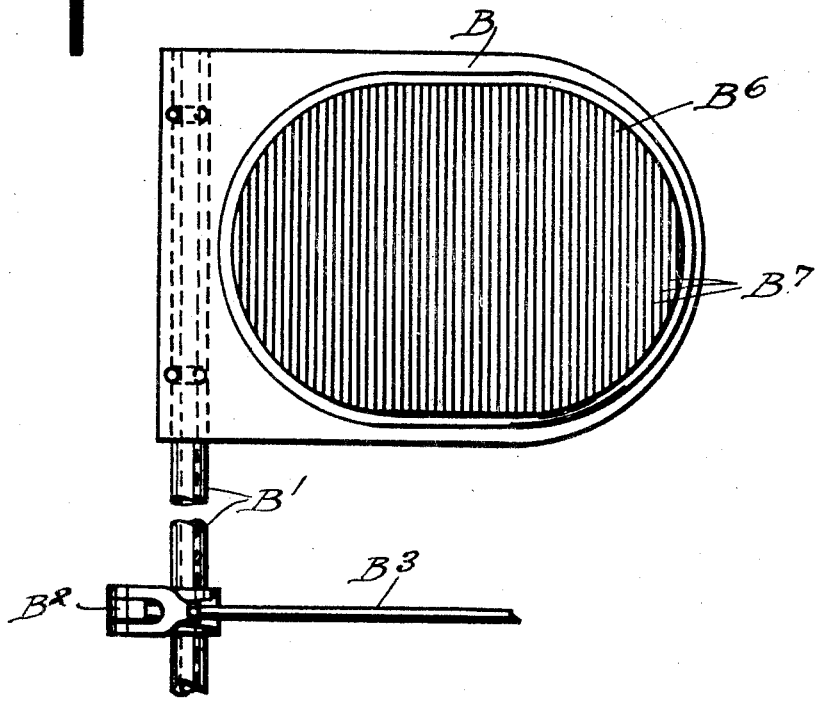
Figure 6 is a detail plan view of the shutter and mounting mechanism.
Figure 7:
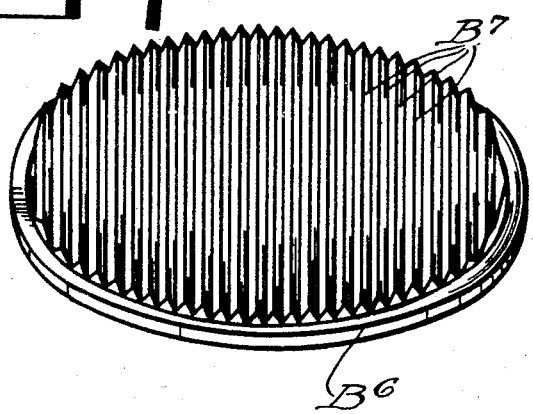
Figure 7 is a perspective of the shutter lens itself.

A is an airplane having wings $A^1$. The underside of each wing is apertured as indicated at $A^2$ and there is mounted within the body of the wing section a reflector bowl $A^3$ having a glass closure $A^4$ and a light source $A^5$. It will be noted that the axis of this bowl is downwardly and forwardly inclined with respect to the under surface of the wing.

Closing the aperture $A^2$ is a shutter $B$ mounted rigidly on a shaft $B^1$. This shaft extends clear across the airplane and controls similar shutters, one in each wing. $B^2$ is a control lever mounted on the shaft and $B^3$ linkage extending to the hand lever $B^4$ in the operating cock pit whereby the operator may control the position of the shutter, this shaft being mounted in suitable bearings $B^5$ as indicated. The shutter takes the form of a loop in which is mounted a glass lens $B^6$ having prismatic refracting surface $B^7$. The length of this loop and refracting member is such that all the light projected by the light source and reflector bowl will impinge upon the refracting shutter. It must be elongated to take care of various positions when it may be inclined to the axis of the light beam.

In the position shown in Figure 3, the light rays impinge upon one series of prism surfaces and are deflected downwardly. In the position shown in Figures 4 and 5 they impinge upon another series of prism surfaces and are projected forwardly in a direction generally parallel with the under surface of the wing. Thus in Figure 3 the light would be used for a floodlight to light up the ground around the plane if some one were working on it and in Figures 4 and 5, the position is such that the light will be projected forwardly to illuminate a landing field as the plane is taking off or landing. By adjusting the angle of the shutter and of course the particular angle of the beam, projection may be controlled. In Figure 3, it will be noted that the shutter closes the underside of the wing and there is no interference, and in Figure 4, the only interference is the flat smooth shutter projected downward at a slight angle from the flat wing surface.

I have illustrated this invention as applied to an airplane and applied to a light which throws its light generally downwardly. Obviously of course the invention might be applied to any type of airship or any other situation where it is desirable to have a light rigidly mounted inside the stream line of the structure with means which could be projected beyond such stream line to project light rays along a surface of the stream line at a sharper angle possible by the direct projection of the unrefracted rays of the light source.

The shutter which closes the opening in which the light source with or without a reflecting bowl is contained serves as a shutter in the sense that it closes the opening against ingress of air during the time when normal flight takes place. The shutter being translucent is not an optical shutter but is a shutter merely in the mechanical sense.

I have illustrated my invention as applied to an airplane. Obviously the device might be applied equally to any type of aircraft lighter than or heavier than the air, the point being that in every case the heavy delicate light source with or without its reflector is contained inside the contour of the ship and only the light rigid simple deflecting means are arranged adjustably mounted so that they may be positioned at the will of the operator independent of the light position to deflect or direct the light rays.

I claim:

1. A landing light for aircraft and the like comprising a reflecting bowl and light source permanently fixed in position within the contour of the ship, the axis of the bowl being inclined to the surface of the ship, a refracting shutter adapted when it lies parallel with the surface of the ship to deflect the beam from the light downwardly in a direction generally normal to the surface of the ship and when it is projected itself beyond the surface of the ship to deflect the beam forwardly in a direction generally parallel with the surface of the ship.

2. A light for aircraft and the like comprising a light source and reflector bowl contained entirely within the contour of the ship, the wall of the ship being apertured in register with the bowl, a pivotally mounted shutter adapted to close the aperture and to permit light to pass therethrough while the aperture is closed, means for adjusting the shutter in selected angular positions with respect to the wall of the ship to control the direction of the light beam.

3. A light for aircraft and the like comprising a light source and reflector bowl contained entirely within the contour of the ship, the wall of the ship being apertured in register with the bowl, a pivotally mounted shutter adapted to close the aperture and to permit light to pass therethrough while the aperture is closed, means for adjusting the shutter in selected angular positions with respect to the wall of the ship to control the direction of the light beam, the light beam when passing through the closed shutter being projected along a line normal to the wall of the ship and when passing through the open shutter to be projected along lines inclined to the direction of projection through the closed shutter.

4. A light for aircraft and the like comprising a light source and reflector bowl contained entirely within the contour of the ship, the wall of the ship being apertured in register with the bowl, a pivotally mounted shutter adapted to close the aperture and to permit light to pass therethrough while the aperture is closed, means for adjusting the shutter in selected angular positions with respect to the wall of the ship to control the direction of the light beam, the shutter being pivoted on its leading edge with respect to the ship, the edge of the shutter which projects beyond the wall of the ship when open being the trailing edge.

5. A light for aircraft and the like comprising a light source and reflector bowl contained entirely within the contour of the ship, the wall of the ship being apertured in register with the bowl, a pivotally mounted shutter adapted to close the aperture and to permit light to pass therethrough while the aperture is closed, means for adjusting the shutter in selected angular positions with respect to the wall of the ship to control the direction of the light beam, the shutter comprising a translucent prismatic panel.

6. A light for aircraft and the like comprising a light source and reflector bowl contained entirely within the contour of the ship, the wall of the ship being apertured in register with the light bowl, a pivotally mounted prismatic shutter adapted to close the aperture, the prisms on the shutter being so related to the light source that when the shutter is closed light is refracted downwardly along a line normal to the wall of the ship, means for angularly adjusting the position of the shutter to selectively direct light along any desired path from a line normal to the ship to a line parallel to the surface thereof and forwardly therealong.

7. A light for aircraft and the like comprising a light source and reflector bowl contained entirely within the contour of the ship, the wall of the ship being apertured in register with the light bowl, a pivotally mounted prismatic shutter adapted to close the aperture, the prisms on the shutter being so related to the light source that when the shutter is closed light is refracted downwardly along a line normal to the wall of the ship, means for angularly adjusting the position of the shutter to selectively direct light along any desired path from a line normal to the ship to a line parallel to the surface thereof and forwardly therealong, the shutter extending rearwardly along the wall of the ship from its pivot point.

8. A light for aircraft and the like comprising a light source and a reflector bowl contained entirely within the contour of the ship, the axis of the bowl being inclined to the surface of the ship, the surface of the ship being apertured in register with the bowl so that unobstructed light rays from the bowl are free to pass out through said aperture along a line inclined to the surface of the ship, a shutter adapted to close said aperture, the shutter being pivoted at the surface of the ship on the side of the aperture toward the front of the ship.

9. A light for aircraft and the like comprising a light source and a reflector bowl contained entirely within the contour of the ship, the axis of the bowl being inclined to the surface of the ship, the surface of the ship being apertured in register with the bowl so that unobstructed light rays from the bowl are free to pass out through said aperture along a line inclined to the surface of the ship, a shutter adapted to close said aperture, the shutter being pivoted at the surface of the ship on the side of the aperture toward the front of the ship, means for selectively controlling the angular position of the shutter from a position of parallelism with the wall of the ship to a position inclined to the wall of the ship such that light rays striking the shutter are refracted thereby and directed forwardly along the wall of the ship.

10. A light for aircraft and the like comprising a light source and a reflector bowl contained entirely within the contour of the ship, the axis of the bowl being inclined to the surface of the ship, the surface of the ship being apertured in register with the bowl so that unobstructed light rays from the bowl are free to pass out through said aperture along a line inclined to the surface of the ship, a shutter adapted to close said aperture, the shutter being pivoted at the surface of the ship on the side of the aperture toward the front of the ship, means for selectively controlling the angular position of the shutter from a position of parallelism with the wall of the ship to a position inclined to the wall of the ship such that light rays striking the shutter are refracted thereby and directed forwardly along the wall of the ship, the shutter being so related to the light source when it is in the closed position light rays from the light source are refracted by the shutter into a path normal to the surface of the ship.

11. A light for aircraft and the like comprising a light source and a reflector bowl contained entirely within the contour of the ship, the axis of the bowl being inclined to the surface of the ship, the surface of the ship being apertured in register with the bowl so that unobstructed light rays from the bowl are free to pass out through said aperture along a line inclined to the surface of the ship, a shutter adapted to close said aperture, the shutter being pivoted at the surface of the ship on the side of the aperture toward the front of the ship, means for selectively controlling the angular position of the shutter from a position of parallelism with the wall of the ship to a position inclined to the wall of the ship such that light rays striking the shutter are refracted thereby and directed forwardly along the wall of the ship, the shutter being so related to the light source that when it is in the closed position light rays from the light source are refracted by the shutter into a path normal to the surface of the ship, and that when the shutter is opened light rays are refracted along paths depending upon the angular position of the shutter anywhere between normal to the surface of the ship and parallel therewith in a forward direction.

Signed at Chicago, county of Cook and State of Illinois, this 11th day of April, 1929.

CHARLES W. DAKE.